United States Patent [19]

Dotson

[11] Patent Number: 4,515,036

[45] Date of Patent: May 7, 1985

[54] VEHICLE PARKING BRAKE SELF-ADJUSTING CONTROL MECHANISM

[75] Inventor: Jarvis L. Dotson, Detroit, Mich.

[73] Assignee: Gulf & Western Manufacturing Company, Southfield, Mich.

[21] Appl. No.: 488,029

[22] Filed: Apr. 25, 1983

[51] Int. Cl.³ .............................. G05G 5/18; F16C 1/22
[52] U.S. Cl. .................................. 74/535; 74/501.5 R; 74/537
[58] Field of Search ................ 74/535, 537, 538, 542, 74/531, 501.5 R; 192/111 A; 188/196 F

[56] References Cited

U.S. PATENT DOCUMENTS

| | | | |
|---|---|---|---|
| 2,147,580 | 2/1939 | McCarthy | 74/535 |
| 2,277,767 | 12/1940 | La Brie | 74/537 |
| 2,405,956 | 8/1946 | Jandus | 74/537 |
| 2,661,492 | 12/1953 | Oishei | 74/501.5 X |
| 3,079,809 | 3/1963 | Fender et al. | 74/539 X |
| 3,109,320 | 11/1963 | Krautwurst | 74/535 X |
| 3,149,500 | 9/1964 | Swats et al. | 74/531 |
| 3,187,595 | 8/1965 | Clark | 74/538 |
| 3,188,883 | 6/1965 | Fender | 74/535 X |
| 3,236,120 | 2/1966 | Fender | 74/531 |
| 3,236,121 | 2/1966 | Gdowik et al. | 74/531 |
| 3,315,538 | 4/1967 | Fender | 74/531 |
| 3,367,208 | 2/1968 | Fender | 74/531 |
| 3,448,633 | 6/1969 | Jackoboice | 74/501.5 |
| 3,580,104 | 5/1971 | Yashiro | 74/535 |
| 4,212,211 | 7/1980 | Rickert | 74/538 |
| 4,319,497 | 3/1982 | Shinto et al. | 74/512 |
| 4,379,500 | 4/1983 | Kamino | 188/196 B |
| 4,440,269 | 4/1984 | Harriot | 188/196 F |

FOREIGN PATENT DOCUMENTS

| | | | |
|---|---|---|---|
| 1315871 | 12/1962 | France | 74/537 |
| 449637 | 7/1936 | United Kingdom | 74/537 |
| 1027240 | 4/1966 | United Kingdom | 74/501 |
| 2004614 | 4/1979 | United Kingdom | 74/501 R |
| 2022210 | 12/1979 | United Kingdom | 192/111 A |
| 591338 | 2/1979 | U.S.S.R. | 192/111 A |

Primary Examiner—Kenneth J. Dorner
Assistant Examiner—Rodney M. Lindsey
Attorney, Agent, or Firm—Body, Vickers & Daniels

[57] ABSTRACT

A vehicle parking brake control mechanism having a clutch drive through which the brake setting actuator lever drives the brake cable to set the brake, is provided with a self-adjusting arrangement for automatically taking up slack in the brake cable. Release means actuated by the actuator lever on return to its brake released position acts to disengage the clutch drive to free the driven element thereof for cable slack take-up movement by an adjusting spring.

19 Claims, 7 Drawing Figures

VEHICLE PARKING BRAKE SELF-ADJUSTING CONTROL MECHANISM

BACKGROUND OF THE INVENTION

The present invention relates, in general, to a control mechanism for vehicle parking brakes and, more particularly, to a control mechanism having a self-adjusting arrangement for automatically taking up slack in the brake cable and maintaining a predetermined minimum amount of tension therein.

Various types of both manually operated and foot operated mechanisms or devices have been developed and utilized for actuating and controlling the parking or emergency brakes of automotive vehicles. Such parking brake control mechanisms have generally included a fulcrumed brake actuator member or lever in conjunction with a locking means or device for holding the actuator lever in brake setting positions, the locking means being releasable to permit release of the parking brakes by the conventional brake springs.

With such prior parking brake control mechanisms, it has been generally necessary to manually adjust the parking brake cable periodically in order to take-up the slack which normally develops in the cable after extended periods of brake usage. If such slack is permitted to accumulate in the brake cable, the parking brake could eventually become totally inoperative and so lead to an unsafe operating condition for the automobile.

As disclosed in U.S. Pat. No. 3,236,120, one commonly known form of such parking brake control mechanisms employs a torsion coil spring the turns of which surround and frictionally grip a drum coaxial with the brake actuator lever fulcrum to retain the lever in brake setting position. With such type brake control mechanisms, excessive brake cable "back-off" is encountered, that is, the movement of the brake actuating cable in a brake releasing direction which occurs during the period that the torsion spring wraps itself tightly onto and grips the drum. Thus, in such constructions the vehicle operator actuates a brake actuator member or lever to set the parking brakes, but the lost motion of the torsion coil spring in frictionally gripping the drum effects a partial release of the brakes because of cable "back-off" which, together with the slack which normally develops in the cable during extended usage of the parking brake, renders the construction unsafe for automotive use.

SUMMARY OF THE INVENTION

The present invention contemplates a new and improved control mechanism for vehicle parking brakes which overcomes all of the above referred to problems and others and provides a self-adjusting brake control mechanism which automatically takes-up slack in the brake actuating cable and thus eliminates the need for manual adjustment thereof to maintain the brake operative.

Briefly stated, in accordance with one aspect of the invention, in a parking brake control mechanism in which the brake setting swing movement of a brake actuator lever about its fulcrum is transmitted to the cable through a clutch drive comprised of a torsion coil locking spring embracing and frictionally gripping an adjusting drum or shaft which drives a cable operating arm locked thereon, a release member is provided for actuation by the actuator lever, on the return swing movement thereof to its brake released position, to disengage the clutch drive and free the adjusting shaft for rotation of the shaft and associated operating arm in a cable tensioning direction by an adjusting spring so as to take-up any slack in the cable. The brake actuator lever may be held in its brake setting rotative position about its fulcrum by any suitable releasable locking arrangement such as a conventional ratchet and pawl mechanism.

In accordance with a further aspect of the invention, the adjusting spring which rotates the adjusting shaft and associated cable actuating arm to take-up the slack in the cable comprises a torsion coil spring substantially coaxial with the adjusting shaft and having its one end anchored and its other end engaged with the shaft to impart its torsional spring force to the shaft to rotate the same.

According to a still further aspect of the invention, a release member is provided for engagement and actuation by the brake actuator lever, on the return swing movement of the brake actuator lever to its brake released position, to engage with the free terminal end portion of the torsion coil locking spring of the clutch drive and slightly uncoil this spring to an extent required to disengage the clutch drive and free the adjusting shaft for rotation by the torsion coil adjusting spring to take-up the cable slack.

The principal object of the invention is to provide a self-adjusting control mechanism for vehicle parking brakes which eliminates the need for any manual adjustment of the brake actuating cable during the service life of the brake.

Another object of the invention is to provide a self-adjusting control mechanism for vehicle parking brakes which is operative to take-up any slack appearing in the brake actuating cable and maintain the cable in a constant tensioned state during the service life of the brake.

Still another object of the invention is to provide a vehicle parking brake control mechanism of the above referred to type which eliminates brake cable "back-off" such as otherwise acts to partially release the brakes and render them unsafe for automotive use Further objects and advantages of the invention will appear from the following description of a preferred embodiment thereof taken in conjunction with the accompanying drawings.

DESCRIPTION OF THE PREFERRED EMBODIMENT

Figure 1:
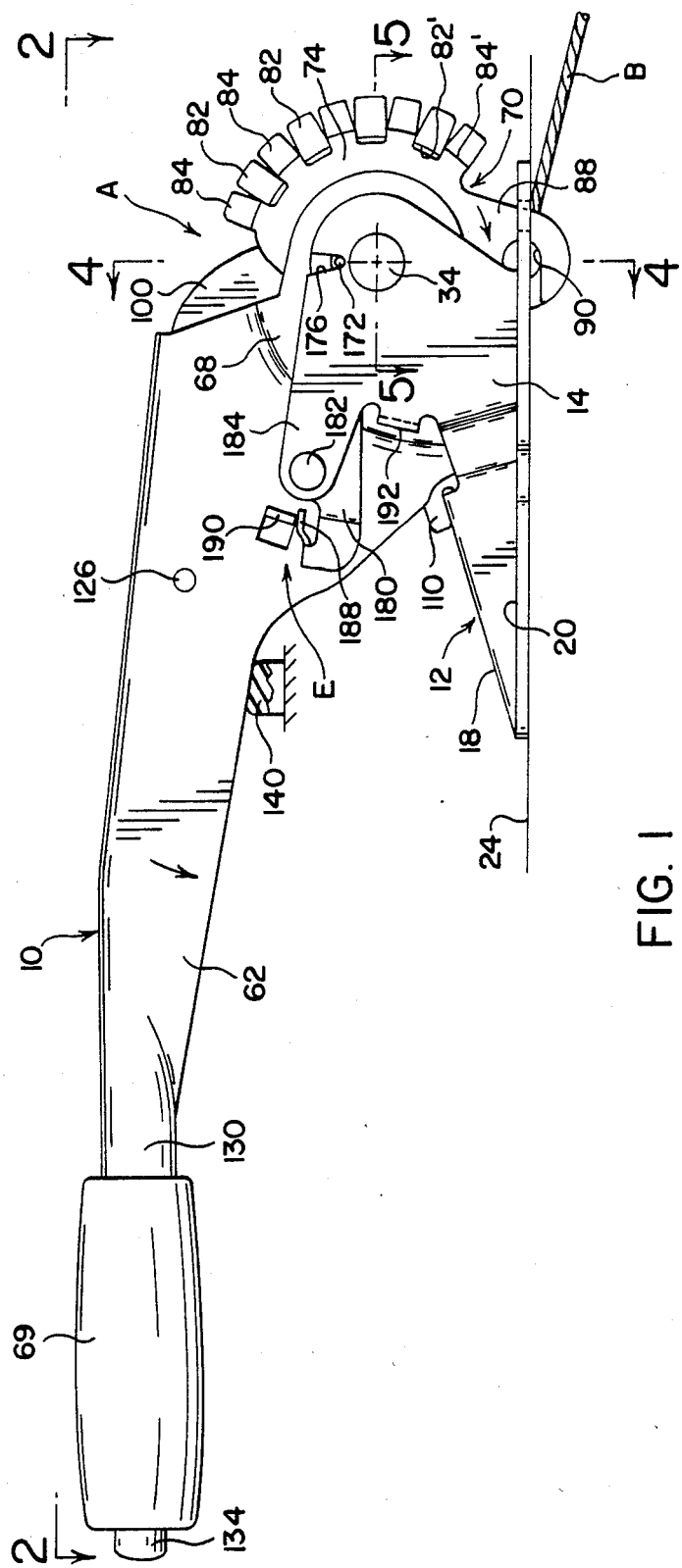
FIG. 1 is a side elevation of a vehicle parking brake control mechanism comprising the invention.
Figure 2:
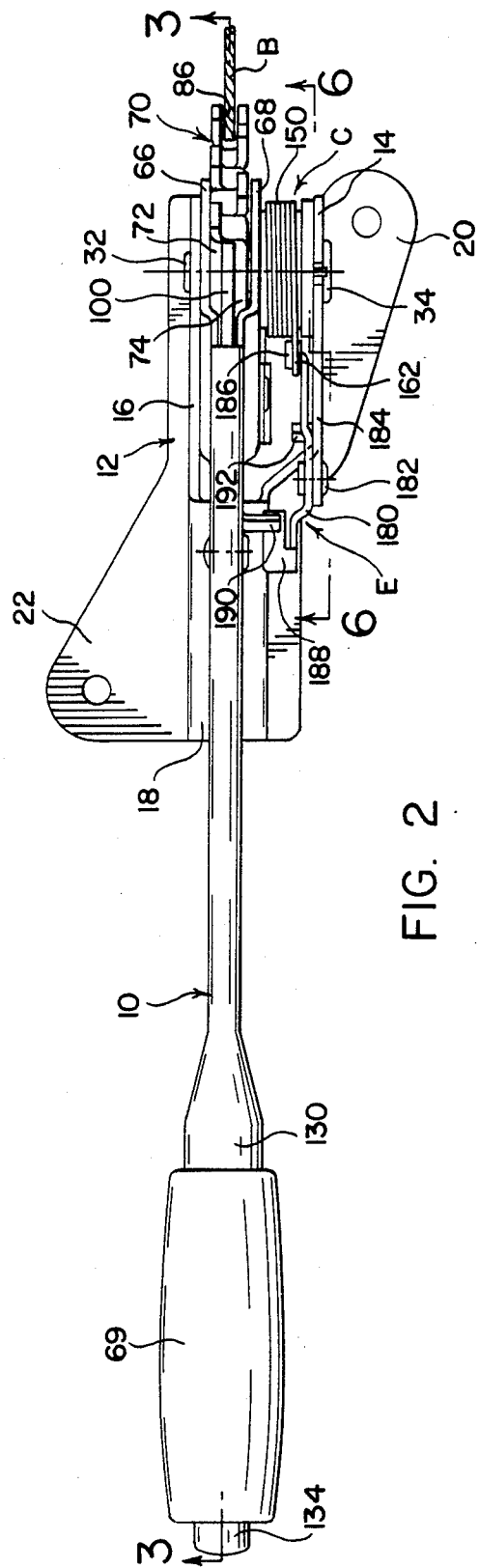
FIG. 2 is a plan view of the control mechanism shown in FIG. 1.

Referring now to the drawings wherein the showings are for the purposes of illustrating the preferred embodiment of the invention only and not for the purposes of limiting same, the figures show the invention as embodied in a control mechanism A for the emergency or parking brakes (not shown) of an automotive vehicle. It is to be understood, however, that the control mechanism A may be utilized for actuating and controlling other apparatus whenever it may be found to have suitable utility therefor. The control mechanism A actuates the vehicle parking brakes through a wire cable B connected in a conventional spring biased manner to the vehicle brakes which, as is customary, are spring loaded to a brake released position by the conventional brake shoe springs.

While the particular parking brake actuating and control mechanism A shown is of the manually operated type, it may be adapted for foot operation as well. The mechanism A comprises a generally horizontally extending elongated brake actuator member or hand lever 10 fulcrumed on a support bracket 12 for vertical swing movement thereon, i.e. upward to set the parking brakes. The bracket 12 is comprised of a pair of parallel, spaced, upright side wall portions 14, 16 joined by a connecting bridge wall or web portion 18 and provided at their bottom edges with laterally outward extending mounting flanges or pad portions 20, 22, respectively, for fastening to the floorboard, console, or other such fixed wall portion 24 of the operator's compartment of an automotive vehicle. As shown more particularly in FIGS. 6 and 7, the connecting bridge wall 18 of bracket 12 extends from one end thereof only part of the way between the full length of the bracket side walls 14, 16 so as to leave an unobstructed space therebetween at the other end of the bracket for the accommodation therein of the main operating parts of the control mechanism A. Also, the bridge wall 18 extends upward at a slight angle from the end of the bracket 12 for a purpose to be hereinafter described.

Mounted on the bracket 12 adjacent the end thereof opposite the end provided with the bridge wall 18 is a central cylindrical spindle or pivot pin 30 which extends between the side walls 14, 16 of support bracket 12. Headed ends 32, 34 on spindle 30 hold it in place on bracket 12 against axial displacement relative thereto. The spindle 30 has a longitudinal center or pivot axis a.

Rotatably mounted on spindle or pivot pin 30 is an adjusting shaft 40 having an axial bore 42 through which the spindle extends to journal the shaft for rotation on the spindle about the pivot axis thereof. The longitudinal center axis of shaft 40 is coincident with the pivot axis a of spindle 30. Shaft 40 is of an axial length approximately corresponding to the spacing between the opposed inside faces 44, 46 of the bracket side walls 14, 16 so as to fit snugly therebetween and be held against axial movement on the spindle 30. As shown particularly in FIGS. 4 and 5, shaft 40 is formed with an enlarged diameter drum portion 50 adjacent one end of the shaft and extending axially inward thereof an appreciable distance from a radially outward extending end flange 52 on one end of the shaft. The drum portion 50 forms a radial shoulder 54 on the shaft 40 located more or less medially of the axial extent thereof, and it serves as one element of a friction drive clutch or locking means C for locking the actuator lever 10 and shaft 40 together for unitary rotative movement about the spindle or pivot pin 30, as described hereinafter. The axial bore 42 of adjusting shaft 40 is formed with an enlarged diameter counterbore portion 56 extending axially inward of the shaft from the flanged end 52 thereof to provide an annular space 58 around the spindle 30 of extended axial length and located between the spindle and the drum portion 50 of the shaft.

The brake actuator lever 10 is suitably formed of sheet steel and is of generally inverted U-shaped section with narrowly spaced side wall portions 60, 62 joined along the top edge of the lever by a connecting top wall portion 64. At the fulcrumed end of lever 10 on the bracket 12, the side walls 60, 62 of the lever are formed with hub portions 66, 68 which are provided with bearing apertures 66', 68' for journaling these hub portions respectively on the journaled portion of the shaft 40 and on the drum portion 50 of the shaft to permit relative rotational movement between the shaft and lever. Hub portions 66, 68 are spaced somewhat farther apart than the lever side wall portions 60, 62 in order to provide a firm journal bearing support for the actuator lever 10 on the shaft 40 against any looseness and wobbling thereon. The actuator lever 10 is preferably provided with a hand grip 69 of rubber or other suitable material at the free end of the lever opposite its fulcrumed end.

Mounted on the adjusting shaft 40 in an axial location thereon between the two opposed hub portions 66, 68 of the actuator lever 10 and locked on the shaft so as to rotate as a unit therewith is an operating arm assembly 70 comprised of a pair of spaced, complementary plate members 72, 74 formed of sheet steel. The plate members 72, 74 are provided with bore openings 76 through which the adjusting shaft 40 extends and closely fits to support the plate members thereon, and the axial extent of the shaft 40 on which the plate members are mounted is provided with flat surfaces 78 (FIGS. 3 and 5) on opposite sides of the shaft which engage with mating flat surfaces 80 on opposite sides of the bore openings 76 in the plate members to thereby key or lock them on the shaft so as to rotate as a unit therewith.

The plate members 72, 74 of the operating arm assembly 70 are formed, around corresponding arcuate peripheral portions thereof centered on the coincident shaft and spindle axis a, with a plurality of similar radially outward projecting cooperating offset fingers 82, 84, the fingers on each plate member being offset toward the other plate member and interlocking or meshing with the fingers on the other plate member to thereby lock the two plate members together in a predetermined oriented position about the spindle axis a and conjointly define a radially outward facing arcuate groove 86 (FIG. 5) thereround for accommodating and retaining the brake cable B upon cumulative rotational adjustment of the shaft 40 in accordance with the invention. The plate members 72, 74 of the operating arm assembly 70 are provided with opposing arm portions or extensions 88 which are provided adjacent their outward ends with socket means 90 in the form of aligned bore openings for rotative fitting therein of the conventional terminal head end anchor cylinder 92 attached to the end of brake cable B. One of the arm extensions 88 is provided with an open ended slot 94 to permit sidewise sliding insertion of the brake cable B and associated head end anchor pin 92 into centered position between the two plate members 72, 74 comprising the operating arm assembly 70, following which the pin 92 and attached cable B are rotated in the bore openings 90 to position and trap the brake cable in operative position between the plate members 72, 74 and out of alignment with the slot 94, thus locking the cable and its head end anchor pin 92 against disengagement from the operating arm assembly 70 during usage of the brake control mechanism A comprising the invention.

Figure 3:
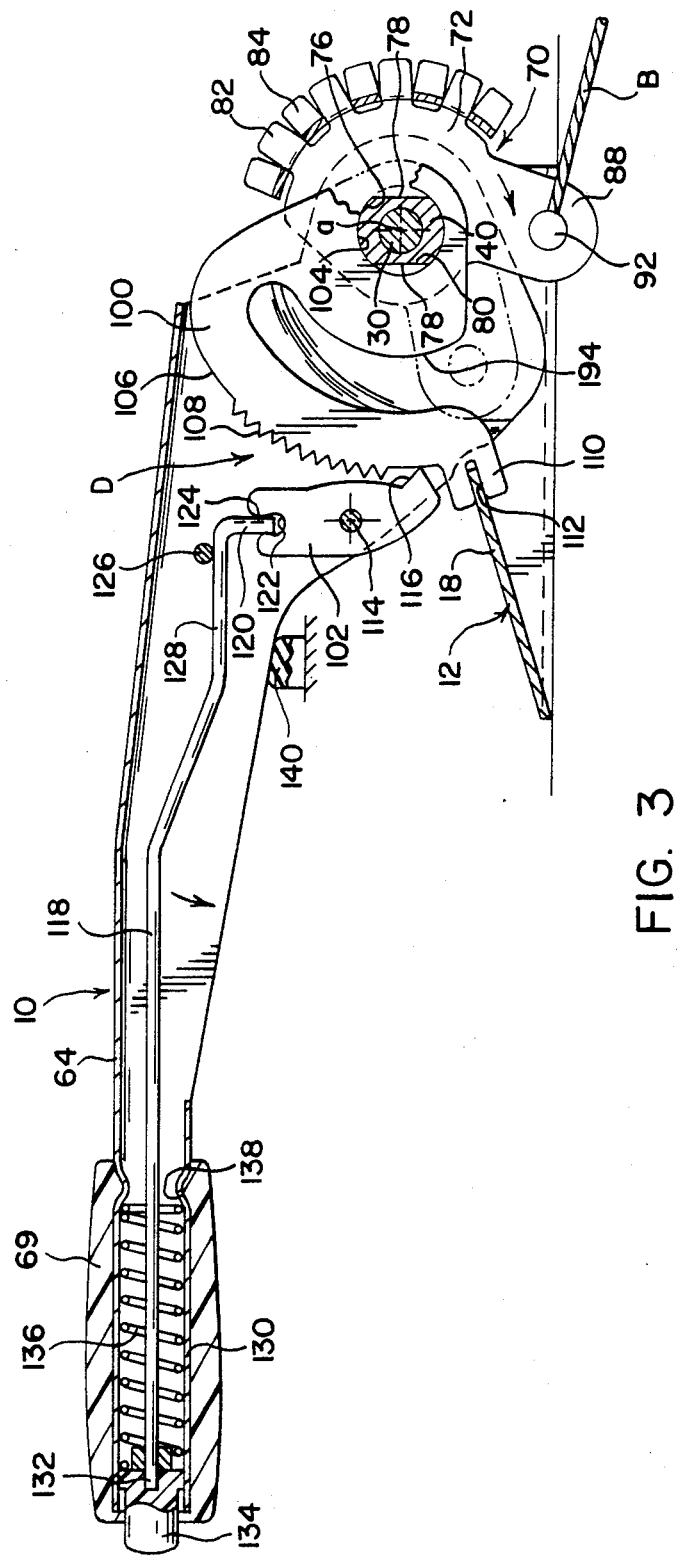
FIG. 3 is a vertical sectional view taken on the line 3—3 of FIG. 2.

As shown in FIG. 3, the brake control mechanism is provided with a suitable locking arrangement D for locking the brake actuator lever 10 in brake setting position. The particular lever locking arrangement D illustrated comprises a sector gear 100 fixedly supported in place on the bracket 12 and on the shaft 40 in a position between the two plate members 72, 74 of the operating arm assembly 70 and between the side walls 60, 62 and hub portions 66, 68 of lever 10, and a cooperating spring loaded locking pawl 102 pivotally mounted on the actuator lever 10. Sector gear 100 is preferably formed of comparatively thick sheet steel and is provided with a bore opening 104 through which the adjusting shaft 40 extends and fits to support the sector gear in place on the shaft while permitting rotation of the latter relative to the sector gear. As will be seen particularly from FIGS. 4 and 5, the flat sector gear 100 and plate members 72, 74 of operating arm assembly 70, together with the flat hub portion 66 of brake actuator lever 10, all fit closely side-by-side on the adjusting shaft 40 between the medial shoulder 54 thereon and the side wall 16 of support bracket 12 to retain the lever 10, operating arm assembly 70, and sector gear 100 in axially fixed position on the shaft 40 while permitting relative rotation between these parts.

Sector gear 100 is formed with an arcuate outer edge 106 (FIG. 3) facing toward the free or hand grip end 69 of the actuator lever 10 and centered on the spindle axis a and provided over a portion of its arcuate extent with an arcuate rack gear 108 likewise centered on the spindle axis a. An anchor lug 110 projects radially outward from the arcuate outer edge 106 of the sector gear 100 at its lower end and is provided with a radially outward opening anchor slot 112 into which the bridge wall 18 of the support bracket 12 extends and fits closely to thereby hold the sector gear 100 in a fixed position journaled on shaft 40 and locked against any rotative movement about the shaft axis a.

The locking pawl 102 is pivotally mounted intermediate its ends on the actuator lever 10 in the space between the side walls 60, 62 thereof, on a pivot pin 114 anchored to the lever walls 60, 62 for pivotal movement in the plane of the flat sector gear 100. The pawl 102 is spring biased to a normally vertically extending pivoted position, as shown in FIG. 3, in which a pointed projection 116 on one end of the pawl is continuously spring pressed against the arcuate outer edge 106 of the sector gear 100 so as to engage with and ride over and mesh with the teeth of the arcuate rack gear 108 of the sector gear, when the lever 10 is swung to its brake setting position as shown by the arrow in FIG. 7, to thereby securely hold and lock the lever in such position.

The spring biasing of pawl 102 to urge the pointed projection 116 thereof against the sector gear 100 is effected by a spring loaded elongated operating rod 118 extending longitudinally within the brake actuator lever 10 between the side walls 60, 62 thereof and provided at one end with a bent end portion 120 which extends into and closely fits within an endwise opening slot 122 in the pawl 102 to thereby connect the operating rod 118 to the pawl. The side walls of the slot 122 are preferably rounded slightly, as shown at 124, to prevent binding of the bent end 120 of operating rod 118 in the slot during the pivotal movements of the pawl by the operating rod. The bent end 120 of rod 118 is held in positive engagement within the slot 122 of pawl 102, against accidental disengagement therefrom, by a hold-down or locking pin 126 secured to and extending between the side walls 60, 62 of the actuator lever 10 and engaging with the top side of the operating rod 118 along a straight portion 128 thereof adjacent the bent end 120 of the lever.

From its connection to the pawl 102, the operating rod 118 extends longitudinally through the brake actuator lever 10 between the side walls 60, 62 thereof and generally axially of and into the free end or hand gripping portion 130 thereof which is formed of tubular shape and is provided with the hand grip 69. Fastened to the end 132 of the operating rod 118 within the tubular free end portion 130 of lever 10 is a release plunger or pushbutton 134 which is slidably movable axially within the tubular lever portion 130 and extends endwise out therefrom for actuation by the vehicle operator to release the hand brake. A compression coil spring 136 is disposed axially within the tubular end portion 130 of lever 10, through which spring the operating rod 118 extends. The spring 136 engages at its opposite ends with, and is compressed between, the release plunger 134 and an internal annular shoulder 138 formed in the tubular end portion 130 of the lever 10 to thereby continuously urge the operating arm 118 in a direction to pivot the pawl 102 so as to maintain the pointed end 116 thereof yieldingly pressed against the arcuate outer edge 106 and rack gear portion 108 of the sector gear 100. Release of the parking brake from its brake setting position, in which position the pawl 102 is engaged with the rack gear portion 108 of sector gear 100, is accomplished by manually pushing the release plunger 134 into the tubular free end portion 130 of the brake actuator lever 10 to disengage the pawl 102 from the rack portion 108, thus freeing the lever 10 for return pivotal movement to its brake released position, as shown by the arrows in FIGS. 1 and 3, by the spring biased brake cable B acting through the operating arm assembly 70, shaft 40, and the engaged clutch drive C. A bumper or buffer 140 is suitably mounted on a fixed support in a position to be engaged by the brake actuator lever 10 on its spring actuated return movement to brake released position. The bumper 140 is preferably fashioned of semihard rubber or similar material to cushion the shock or impact of the return swing movement of the brake actuator lever 10.

The friction drive clutch C, which is normally engaged to in effect lock the brake actuator lever 10 and adjusting shaft 40 together so as to rotate as a unit about the spindle or pivot pin 30, is comprised of a torsion coil locking spring 150 embracing, i.e. having its coil convolutions or turns 152 coiled around and frictionally gripping the exterior surface 154 of the enlarged diameter drum portion 50 of the adjusting shaft 40. The torsion coil spring 150 is wound with an inside coil diameter somewhat smaller than the outside diameter of the drum portion 50 of shaft 40 so that the coil spring must be uncoiled or torsioned to increase the inside diameter thereof sufficiently to enable the sliding of the coil spring into position over the drum portion 50 during the assembly of the control mechanism A. On subsequent removal of the torsional uncoiling force applied to the coil spring 150 such as frees the spring for return or contraction toward its original "as wound" state and inside diameter, the coil convolutions 152 then contract tightly against the exterior surface 154 of the drum portion 50, due to the torsional force present in the spring, to frictionally engage and grip this surface 154 and thus provide the engaged condition of the friction drive clutch C.

Figure 4:
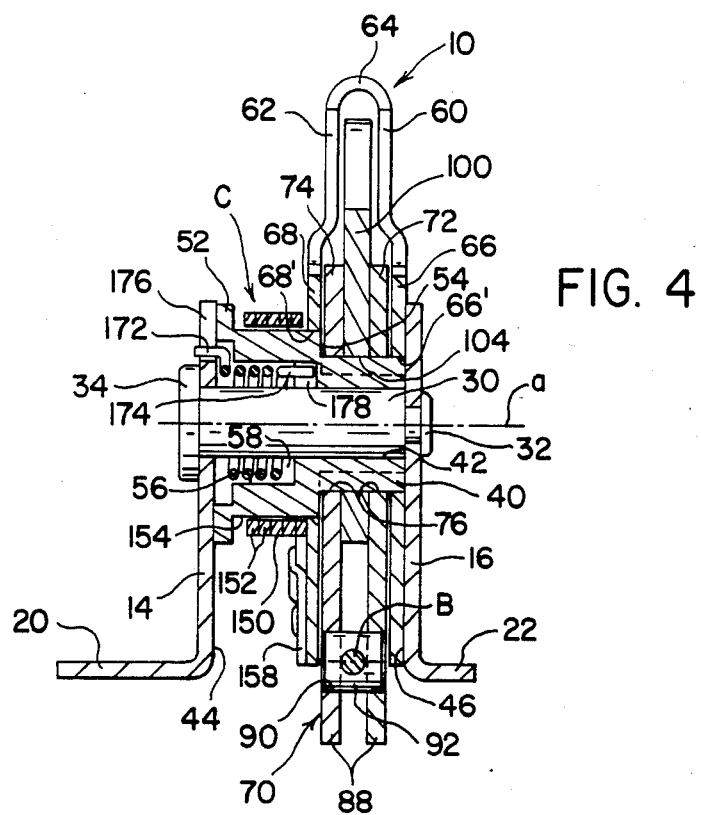
FIG. 4 is a vertical sectional view taken on the line 4—4 of FIG. 1.
Figure 5:
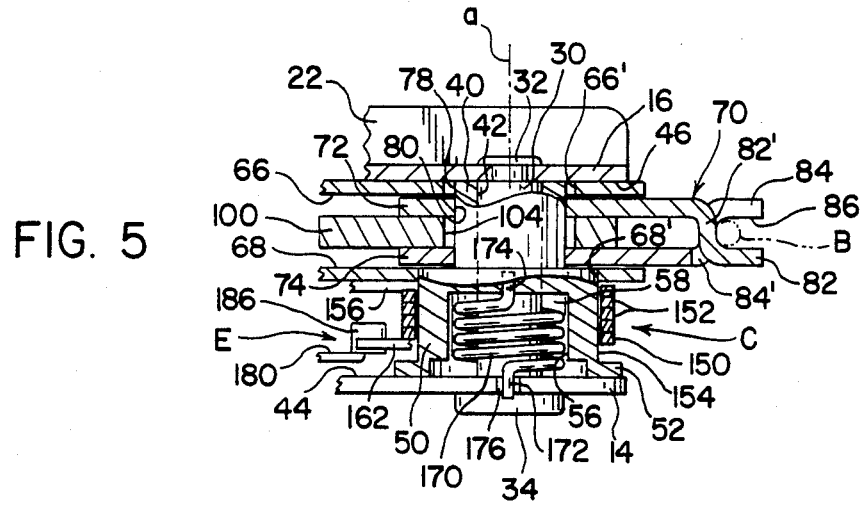
FIG. 5 is a horizontal sectional view taken on the line 5—5 of FIG. 1.

As particularly shown in FIGS. 4 and 5, the torsion coil locking spring 150 is formed of hardened spring steel wire material of essentially rectangular cross-section and wound with the wider flat sides thereof disposed normal to the coil axis so as to afford maximum torsional contractive force of the coil convolutions 152 around the cylindrical exterior surface 154 of the drum portion 50 of shaft 40 and maximum frictional gripping of the shaft by the coil spring 150. The coil spring 150 is wound with the required number of coil convolutions 152 to provide the necessary frictional gripping or locking force between the spring 150 and the shaft 40 to securely hold or retain the parking brakes in set position. To this end, experience has shown that about six or so coil convolutions 152 will suffice for such purpose. Torsion coil clutch arrangements C such as described above are, of course, well known in themselves, as shown and described for example in the aforementioned U.S. Pat. No. 3,236,120.

The torsion coil locking spring 150 is formed at one end thereof with a projecting terminal end portion 156 extending straight out tangentially from the coil and anchored in a slot in an anchor plate 158 suitably fastened to the brake actuator lever 10 as by fastening rivets 160, for example, to thereby fixedly secure the terminal end portion 156 of spring 150 to the actuator lever 10. At its other end, the spring 150 is formed with a similar projecting straight terminal end portion 162 which is unsecured and free of any support therefor for freedom of movement to enable the coil convolutions 152 to normally contract around and frictionally grip the exterior surface 154 of the drum portion 50 of shaft 40.

In accordance with the invention, the parking brake control mechanism A is further provided with an adjusting spring means or member 170 for continuously exerting an appreciable torque force on the adjusting shaft 40 tending to rotate this shaft and the operating arm assembly 70 keyed thereon in the same direction (clockwise as shown by the arrows in FIGS. 6 and 7) as is required to set the parking brakes. In the particular embodiment of the invention illustrated, the adjusting spring member 170 comprises a torsion coil spring positioned within the annular space 58 between the spindle 30 and enlarged diameter or drum portion 50 of the adjusting shaft 40, with the turns of the coil spring 170 coiled around the spindle 30 but sufficiently spaced from the annular surfaces of annular space 58, when the spring is in its fully torsioned condition at assembly of the various components of the control mechanism A, to permit unrestricted torsional releasing of the spring to the extent necessary for the purposes of the invention.

The opposite ends of the adjusting coil spring 170 are formed with bent-out terminal end portions 172 and 174 which extend parallel to the axis of the coil spring 170. One of these terminal end portions, i.e. end portion 172, is fixedly anchored in a slot 176 in support bracket 12, as shown in FIGS. 1, 4 and 5, while the other terminal end portion 174 is similarly anchored in an internal radial slot 178 in the adjusting shaft 40 located at the inner end of the counterbore 56 therein. The torsion coil adjusting spring 170 is formed of spring steel wire and, for the purposes of the invention, is formed with torsional spring characteristics enabling it to be forcefully torsionally sprung or deflected from its free or undeflected state through an appreciable radius angle of deflection about the coil axis amounting to somewhat in excess of 150°, for example, during assembly of the spring in place in the control mechanism A, with its terminal ends 172 and 174 caught in the anchor slots 176, 178.

Figure 6:
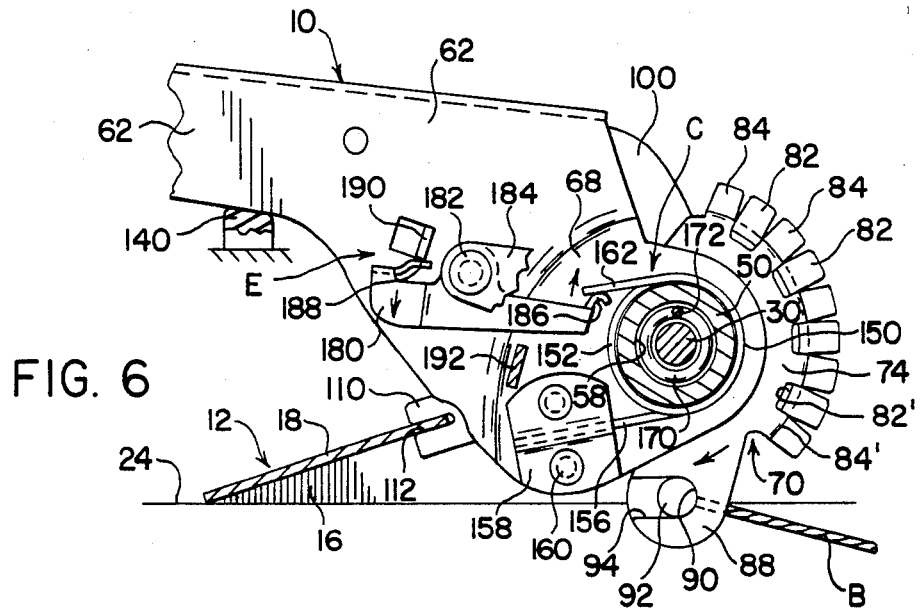
FIG. 6 is a fragmentary side elevation of the control mechanism of FIG. 1 shown in the brake released position thereof and with portions of the mechanism shown broken away; and, FIG. 7 is a fragmentary side elevation of the control mechanism of FIG. 1 shown in the brake setting position thereof.

The control mechanism A is provided with release means E for disengaging the friction drive clutch C at the end of the return swing movement of the actuator lever 10 from its brake setting position to its brake release position, to thereby free the adjusting shaft 40 for rotative movement of this shaft and its associated operating arm assembly 70 by the adjusting coil spring 170 in the direction, as indicated by the arrows in FIGS. 1, 3, 6 and 7, to apply a tensioning force to the cable B serving to take-up any stretch or slack that may remain therein following the release of the parking brakes and tighten the cable to a predetermined amount of tension. In the particular case illustrated, the release means E comprises a generally horizontally extending release lever 180 pivotally mounted intermediate its ends, on a pivot pin 182 supported in a projecting arm portion 184 of the support bracket 12, to pivot in a vertical plane disposed generally normal to the coil axis of the torsion coil locking spring 150. The release lever 180 is provided at the end of one arm with a lateral finger 186 having a rounded end for engaging with the free terminal end portion 162 on the torsion coil locking spring 150, as shown in FIG. 6, on pivotal movement of the release member by the brake actuator lever 10 during the last portion of its return swing movement to its brake released position. The engagement of the release lever 180 with the free terminal end portion 162 of the locking coil spring 150 acts to move the spring end portion 162 in a direction about the coil axis, as indicated by the arrow in FIG. 6, to slightly unwind the convolutions 152 of the spring 150 sufficiently to release the friction grip thereof on the drum portion 50 of the adjusting shaft 40 and effectively disengage the drive clutch C, thus freeing the shaft 40 for rotation by the adjusting spring 170 to take-up any stretch or slack remaining in the cable B at such time. The other arm of the release lever 180 is provided with a lateral contact pad or lug 188 which, as shown in FIGS. 1 and 6, is engaged by a cooperating projection or lug 190 on the brake actuator lever 10, during the very last portion of the return swing movement of this lever 10 to its brake released position, to pivot the release member 180 into engagement with the free terminal end portion 162 of the torsion coil locking spring 150 to effect the disengagement of the drive clutch C and free the adjusting shaft 40 so as to permit the cable slack take-up rotative adjustment movement of the shaft by the adjusting spring 170. It will be appreciated that the tensioning force applied to the brake cable B at this time by the adjusting spring 170, acting through the adjusting shaft 40 and its associated operating arm assembly 70, should be sufficient to tighten the cable to a predetermined minimum tension but somewhat less than the cable return biasing force normally exerted on the brake cable by the conventional cable return and brake shoe springs so as not to overcome this cable return biasing force and itself reset the parking brakes.

Figure 7:
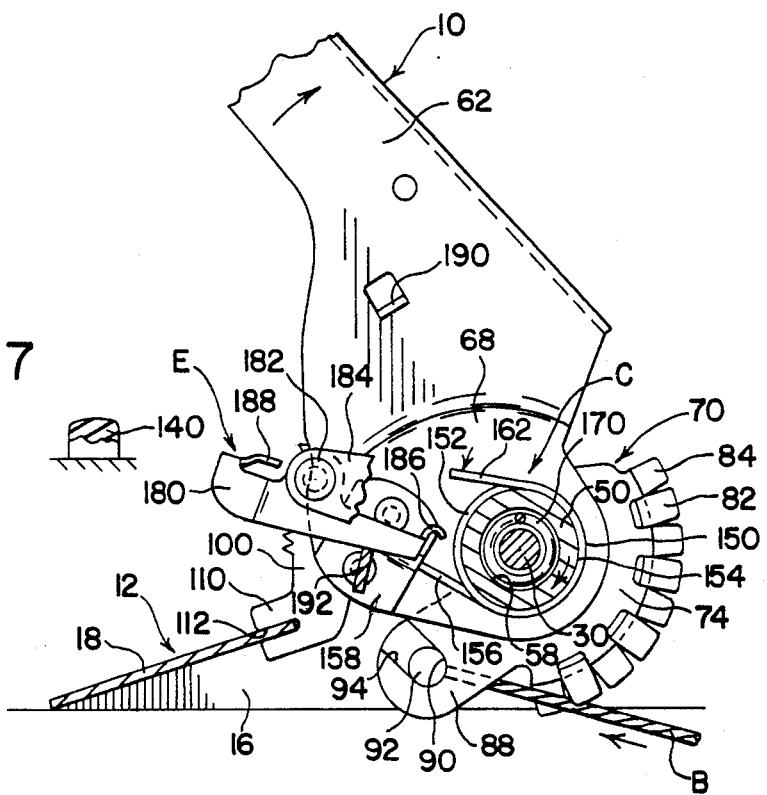

On the next succeeding swing movement of the brake actuator lever 10 to set the parking brakes, the projecting lug 190 on the lever 10 immediately disengages from the release lever 180, thereby freeing the deflected free terminal end portion 162 of the torsioned locking coil spring 150 for return thereof to its original position, as indicated by the arrow in FIG. 7, by the torsional force of this spring. As a consequence, the convolutions 152 of the torsion coil locking spring 150 immediately recoil and contract back into frictional gripping engagement with the exterior surface 154 of the drum portion 50 of adjusting shaft 40, thereby reengaging the friction drive clutch C once again. The continued swing movement of the brake actuator lever 10 to its brake setting position then acts, through the re-engaged drive clutch C, to rotate the adjusting shaft 40 and associated operating arm assembly in unison with the actuator lever 10 to set the parking brakes. Also during this continued swing movement of the actuator lever 10 to its brake setting position, the release lever 180 is pivoted back to a predetermined set position on the support bracket 12 in engagement with a stop lug 192 thereon, as shown in FIG. 7, in readiness for re-engagement and pivotal actuation by the actuator lug 190 when the actuator lever 10 is subsequently returned to its brake released position.

The above described return pivotal movement of the release lever 180 back to its predetermined set position in engagement with the stop lug 192 is effected by the continued engagement of the deflected free terminal end portion 162 of the torsioned locking coil spring 150 with the finger 186 on the release lever during the very first portion of the swing movement of the actuator lever 10 to its brake setting position. Since the release lever 180 is freed at this time for pivotal movement back to its predetermined set position in engagement with the stop lug 192 because of the disengagement of the lug 190 on the actuator lever 10 from the contact pad 188 on the release lever as the actuator lever is swung to its brake setting position, the free end 162 of the torsioned locking coil spring 150 then in engagement with the finger 186 on the release lever thus acts, during its return movement to its original angular position about the drum portion 50 of the adjusting shaft 40 as the freed torsion locking coil spring 150 recoils and contracts back into frictional gripping engagement with the drum portion 50, to progressively pivot the release lever 180 back to its predetermined set position in engagement with the stop lug 192.

It will be appreciated that repeated rotative adjustment movements of the adjusting shaft 40 and associated operating arm assembly 70 by the adjusting spring 170 such as may occur from time to time during continued service usage of the brake control mechanism A, will be accumulative and result in a progressively advanced (clockwise direction in FIG. 6) brake released or starting rotational position of the shaft 40 and operating arm assembly 70 about the spindle 30, as shown in dash-dot lines in FIG. 3. To permit such cumulative rotative adjustment movement of the shaft 40 and arm assembly 70 without interference, the sector gear 100 is provided with an open ended arcuate slot 194 centered on the spindle axis a for accommodating therein the anchor pin 92 of the brake cable B as well as the laterally bent offsetting walls 82′ and 84′ of the fingers 82 and 84 on the plate members 72, 74 forming the operating arm assembly 70. The finger portions 82′ and 84′ extend generally parallel to the spindle axis a and, except for their accommodation within the sector gear slot 192, would otherwise strike against the sector gear 100 and prevent the cumulative rotative adjustment movement of the shaft 40 and operating arm assembly 70 by the adjustment spring 170 during extended service usage of the parking brakes.

It will be further appreciated that the cable receiving arcuate groove 86 of the operating arm assembly 70 assures that the tensioning force applied by the torsion adjusting spring 170, shaft 40 and operating arm assembly 70 to the brake cable B always will be applied thereto along a force line having a moment or lever arm measured from the shaft axis a at least equal to the root radius of the arcuate groove 86 and thus sufficient to assure that the cable B will be maintained adequately tensioned at all times to a predetermined minimum tension during the use of the control mechanism A.

The operation of the parking brake control mechanism A to set the parking brakes of the vehicle is effected by the swinging of the brake actuator lever 10 by the vehicle operator from its brake released pivoted position (FIGS. 1, 3 and 6) to a brake setting pivoted position (FIG. 7) wherein there is sufficient tension in the brake cable B to hold the vehicle stationary, in which brake set position the actuator lever is then locked by the engagement of the spring biased pawl 102 with the rack gear 108 of the sector gear 100. At the very start of this brake setting swing movement of the brake actuator lever 10, the projecting lug 190 thereon moves away from and disengages the release lever 180, allowing the free end 162 of the torsion coil locking spring 150 of the friction drive clutch C, which at this time is in a disengaged condition, to move freely and thus permit the convolutions 152 of the locking spring 150 to contract tightly onto and lock-up with the drum portion 50 of adjusting shaft 40 to thereby frictionally grip the drum portion 50 and re-engage the friction drive clutch C. The re-engaged drive clutch C then acts, during the further swing movement of actuator lever to its brake setting position (FIG. 7), to rotate the adjusting shaft 40 and its associated operating arm assembly 70 as a unit with the actuator lever, thus actuating or pulling the brake cable B to set the parking brakes.

To release the set parking brakes, the operator of the vehicle pushes the release plunger 134 on the end of the actuator lever 10 inwardly to cause the operating rod 118 to pivot the locking pawl 102 out of engagement with the rack gear 108 on sector gear 100, thus freeing the actuator lever for quick return swing movement to its brake released position by the spring biased brake cable B acting through the operating arm assembly 70, shaft 40, the engaged drive clutch C, and the anchored fastening of the terminal end portion 156 of the torsion coil locking spring 150 of the engaged clutch C to the actuator lever 10 by the anchor plate 158. At the end of the return swing movement of the actuator lever 10 to its brake released position (FIGS. 1, 3 and 6), the projection 190 on this lever engages with and pivots the release lever 180 to engage with and move the free terminal end portion 162 of the locking coil spring 150 in a direction to slightly unwind the convolutions 152 of the spring sufficiently and at least momentarily to release their friction grip on the drum portion 50 of adjusting shaft 40 so as to disengage the drive clutch C. The disengagement of the drive clutch C at this time frees the shaft 40 and its associated operating arm assembly 70 for instant rotation in a direction (clockwise in FIG. 6) by the adjusting spring 170 to take up any stretch or slack then remaining in the brake cable B. Any increments of slack which develop in the brake cable B with time thus are automatically taken up by the adjusting spring on each release of the parking brakes from their brake set position. As a result, the brake cable B is maintained in a constantly tensioned condition at all times so that the parking brakes remain in properly operative condition throughout their useful service life without requiring any manual adjustment of the cable to maintain them operative.

The invention has been described herein with reference to a preferred embodiment thereof. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. Control mechanism for vehicle parking brakes comprising, in combination, a mounting bracket, an adjusting shaft journaled on said bracket, a brake actuator lever pivotable on said shaft, operating arm means locked on said shaft for attachment to the head end of a normally spring biased brake actuating cable, clutch means normally locking said actuator lever to said shaft for unitary rotative movement therewith in one direction to set the parking brakes and in the other direction on release of said brakes, locking means for locking said lever in a brake setting pivotal position on said bracket, adjusting spring means normally urging said operating arm means in said one rotative direction, and release means actuated by said actuator lever, on pivotal return movement thereof from its brake set to its brake released position, for disengaging said clutch means to permit said adjusting spring means to rotate said shaft in said one direction relative to said actuator lever, to take up slack in the brake cable and maintain a predetermined minimum tension therein.

2. Parking brake control mechanism as defined in claim 1, wherein the force applied to the brake cable by said adjusting spring means to tension the cable is less than the normal spring-biased tension force in said cable.

3. Parking brake control mechanism as defined in claim 1, wherein the said adjusting spring means comprises a torsion coil adjusting spring having one end leg portion thereof anchored to said bracket and the other end leg portion thereof anchored to said adjusting shaft.

4. Parking brake control mechanism as defined in claim 1, wherein the said clutch means includes a torsion coil locking spring embracing said shaft and having one terminal end portion thereof free and the other terminal end portion anchored to said actuator lever, said locking spring having the coil turns thereof normally frictionally engaging around the said shaft to engage said clutch means and lock the shaft and lever against relative rotation.

5. Parking brake control mechanism as defined in claim 4, wherein the said release means comprises a release lever pivotally mounted on said bracket and pivoted by said actuator lever, on pivotal return movement thereof to its brake released position, to engage with the said free terminal end portion of said torsion coil locking spring and effect a slight uncoiling thereof sufficient to release the friction grip of said locking spring on said shaft and disengage said clutch means.

6. Parking brake control mechanism as defined in claim 5, wherein the said adjusting spring means comprises a torsion coil adjusting spring having one end leg portion thereof anchored to said bracket and the other end leg portion thereof anchored to said adjusting shaft.

7. Parking brake control mechanism as defined in claim 5, wherein one arm of said release lever is engaged by a projection on said actuator lever to pivot the release lever and swing the other arm thereof in a first direction to engage with the said free terminal end portion of said torsion coil locking spring to effect the said slight uncoiling thereof.

8. Parking brake control mechanism as defined in claim 7, wherein the said other arm of said release lever is swung in a second direction opposite said first direction, on pivotal movement of the actuator lever to its brake setting position, into engagement with a limiting stop on said bracket to thereby locate the release lever in a predetermined set pivotal position thereon for engagement with the said projection on the actuator lever on the ensuing return pivotal movement thereof to its brake released position.

9. Parking brake control mechanism as defined in claim 1, and including a central spindle supported on said bracket and extending through an axial bore in said adjusting shaft to journal said shaft for rotation about the spindle axis.

10. Parking brake mechanism as defined in claim 3, and including a central spindle supported on said bracket and on which the said adjusting shaft is journaled for rotation about the spindle axis, said shaft having an axial bore through which the said spindle extends and provided with an enlarged diameter counterbore portion at one end of the shaft within which the said torsion coil adjusting spring is received and supported in a position embracing the said spindle with its coil axis substantially coincident with the spindle axis.

11. Parking brake control mechanism as defined in claim 1, wherein the said operating arm means comprises a pair of plate members interlocked together in spaced apart relation on said shaft, and said locking means includes a sector gear supported on said shaft in a position between said plate members.

12. Parking brake control mechanism as defined in claim 1, wherein the said operating arm means comprises a pair of plate members interlocked together in spaced apart relation on said shaft and provided with socket means for attachment of the head end of the brake cable to the operating arm means, said plate members each being formed with a plurality of radially outward projecting offset fingers, the fingers on each one of the plate members being interposed between and interlocked with the fingers on the other one of said plate members, said fingers being disposed in an arc centered around the shaft to conjointly define a radially outward facing arcuate groove therearound for accommodating and retaining the brake cable therein upon cumulative rotational adjustment of said shaft by said adjusting spring means.

13. Parking brake control mechanism as defined in claim 1, wherein the said locking means includes a sector gear supported on said shaft and the said head end of the brake cable includes an anchor pin supported by said operating arm means and extending parallel to the axis of said shaft, the said anchor pin and said sector gear being disposed in a common plane normal to the axis of said shaft, and said sector gear having an arcuate slot centered on said shaft axis and open at one end for accommodating therein the said anchor pin upon cumulative rotational adjustment of said shaft by said adjusting spring means.

14. Parking brake control mechanism as defined in claim 11, wherein the said head end of the brake cable includes an anchor pin supported by and extending between said plate members in a direction parallel to the axis of said shaft, and the said sector gear is provided with an arcuate slot concentric with said shaft axis and open at one end for accommodating therein the said anchor pin upon cumulative rotational adjusting of said shaft by said adjustment spring means.

15. Parking brake control mechanism as defined in claim 1, wherein the said locking means on said lever and bracket comprises a pawl pivotally mounted on said actuator lever and a cooperating sector gear fulcrumed on said adjusting shaft and anchored to said bracket against rotation relative thereto, said sector gear having an arcuate rack portion concentric with said shaft and said pawl being normally spring-biased against said sector gear into spring loaded intermeshing engagement with the teeth of said sector gear rack portion when the actuator lever is pivoted to its brake setting position, and pawl releasing means on said actuator lever for disengaging the said pawl from intermeshed engagement with the teeth of the said rack portion of said sector gear to free the actuator lever for return pivotal movement to its normal brake released position.

16. Parking brake control mechanism as defined in claim 3, and including a central spindle supported on said bracket and on which the said adjusting shaft is journaled for rotation about the spindle axis, said shaft having an enlarged diameter drum portion extending axially of said shaft on one end thereof and forming an annular shoulder thereon, said shaft also having a bore extending through the shaft and through which the said spindle extends, said shaft being provided with an enlarged diameter counterbore portion at the said one end of the shaft within which the said torsion coil adjusting spring is received and supported in a position embracing the said spindle with its coil axis substantially coincident with the spindle axis, said clutch means including a torsion coil locking spring embracing the said drum portion of said shaft and having one terminal end portion thereof free and the other terminal end portion anchored to said actuator lever, and said locking spring having the coil turns thereof normally frictionally engaging around the said drum portion of the shaft to engage said clutch and lock the shaft and lever against relative rotation.

17. Parking brake control mechanism as defined in claim 11, wherein the said mounting bracket is formed with a pair of spaced vertical side walls and the said brake actuator lever is formed with spaced side wall portions journaled on said shaft between which side wall portions the said plate members of said operating arm means and the said sector gear are located and held in place axially on said shaft between an exterior annular medial shoulder thereon and one of the said vertical side walls of said bracket.

18. Control mechanism for vehicle parking brakes comprising, in combination, a mounting bracket, an adjusting shaft journaled on said bracket, a brake actuator lever fulcrumed on said shaft for pivotal movement thereon, operating arms means locked on said shaft for attachment to the head end of a normally spring-biased brake actuating cable, a torsion coil locking spring embracing said shaft with one terminal end portion thereof free and the other terminal end portion anchored to said actuator lever, said locking spring normally frictionally engaging and locking the shaft to said actuator lever for unitary rotative movement therewith in one direction to set the parking brakes and in the other direction on release of said brakes, cooperating locking means supported on said lever and bracket for locking said lever in a brake setting pivotal position, said locking means being disengageable to permit return pivotal movement of the lever to a brake released position by the spring-biased brake cable, adjusting spring means continuously exerting a torque force on said shaft tending to rotate the shaft and the associated said operating arm means thereon in said one rotative direction, and a release member movably mounted on said bracket and actuated by said actuator lever, at the end of the return pivotal movement thereof to its brake released position, to engage with the said free terminal end portion of and uncoil the said torsion coil locking spring to an extent sufficient to release the friction grip thereof on said shaft and free it for rotational movement by said adjusting spring means to take-up slack in the said cable and maintain a predetermined minimum tension therein.

19. Parking brake control mechanism as defined in claim 18, wherein the said adjusting spring means comprises a torsion coil spring having one end leg portion thereof anchored to said bracket and the other end leg portion thereof anchored to said adjusting shaft.

* * * * *